United States Patent [19]

Rapoport et al.

[11] 3,878,258

[45] Apr. 15, 1975

[54] PREPARATION OF CYCLODODECATRIENE

[75] Inventors: Morris Rapoport, Orange; David Lee Sullivan, Victoria, both of Tex.

[73] Assignee: E. I. du Pont de Nemours and Company, Wilmington, Del.

[22] Filed: July 11, 1974

[21] Appl. No.: 487,812

[52] U.S. Cl. ............................................ 260/666 B
[51] Int. Cl. ............................................. C07c 3/00
[58] Field of Search ................................ 260/666 B

[56] References Cited
UNITED STATES PATENTS

| | | | |
|---|---|---|---|
| 3,149,174 | 9/1964 | Mueller | 260/666 B |
| 3,157,708 | 11/1964 | Munley | 260/666 B |
| 3,185,741 | 5/1965 | Zueck et al. | 260/666 B |
| 3,344,199 | 9/1967 | Brenner | 260/666 B |
| 3,499,049 | 3/1970 | Hochmuth et al. | 260/666 B |
| 3,523,980 | 8/1970 | Sullivan | 260/666 B |
| 3,546,309 | 12/1970 | Koch et al. | 260/666 B |
| 3,644,548 | 2/1972 | Takahas et al. | 260/666 B |
| 3,655,795 | 4/1972 | Sullivan | 260/666 B |

*Primary Examiner*—Veronica O'Keefe

[57] ABSTRACT

Process for preparing 1,5,9-cyclododecatriene by contacting butadiene with a catalyst system resulting from the mixing of an aluminum composition of the structure $Z_{(2.5-3.5)}Al_2Cl_{(3.5-2.5)}$ wherein Z is selected from the group consisting of alkyl radicals containing from 2 to 4 carbon atoms and the phenyl radical; a titanium compound of the formula $TiA_4$ wherein A is selected from the class consisting of Cl, Br, I and OR wherein R is an organic radical of from 1 to 20 carbon atoms; and a promoter for the catalyst system wherein the promoter is selected from the group consisting of water, oxygen and oxygen-containing organic compounds, at a temperature in the range of 20° to 120°C. and at a pressure of 0.5 to 50 atmospheres and recovering cyclododecatriene-1,5,9 along with by-products 1,5-cyclooctadiene and 4-vinylcyclohexene, the improvement which comprises adding an iodide-containing composition or compound selected from the group consisting of $Z_{(2.5-3.5)}Al_2I_{(3.5-2.5)}$, $Z_2AlI$, $ZAlI_2$, and $I_2$ wherein Z is selected from the group consisting of alkyl radicals containing from 2 to 4 carbon atoms and the phenyl radical, the molar ratio of iodine or iodide-containing composition or compound to aluminum composition being in the range of 0.05:10 to 5:10.

8 Claims, No Drawings

PREPARATION OF CYCLODODECATRIENE

BACKGROUND OF THE INVENTION

1. Field of the Invention

This invention relates to a process for the trimerization of butadiene to cyclododecatriene(1,5,9) (CDDT) using a catalyst comprising an alkyl aluminum iodide or iodine. More specifically, the present invention relates to a process for the preparation of CDDT from butadiene by use of a catalyst resulting from the combination of an organoaluminum sesquichloride, a tetravalent titanium compound, water and iodine or an alkyl aluminum iodide compound.

2. Description of the Prior Art

The production of CDDT by subjecting butadiene to the action of various catalysts is known. Butadiene trimerization catalysts are disclosed in Schneider et al., U.S. Pat. No. 3,076,045, Wilke, U.S. Pat. No. 2,964,574, Koch et al., U.S. Pat. No. 3,381,045, Eleuterio et al., U.S. Pat. No. 3,381,047, and Brenner, U.S. Pat. No. 3,344,199.

The present invention provides an improvement over the processes that involve alkyl aluminum sesquichloride, titanium tetrahalides and a promoter, e.g. water, in yield of CDDT from butadiene, in productivity and in catalyst efficiency by the use of a new catalyst system.

SUMMARY OF THE INVENTION

The present invention involves the use of a new catalyst system which comprises (a) a portion of the alkyl aluminum sesquichloride catalyst component of previously known catalyst systems for the trimerization of butadiene, (b) a tetravalent titanium compound, (c) a promoter, and (d) 0.5–50 mole percent of a composition or compound selected from an alkyl aluminum diiodide, a dialkyl aluminum iodide, an alkyl aluminum sesquiiodide compound and iodine, based on the alkyl aluminum sesquichloride. Thus the catalyst of the present invention comprises the combination of (1) a tetravalent titanium compound, (2) alkyl aluminum sesquichloride, (3) a composition or compound selected from an alkyl aluminum diiodide, a dialkyl aluminum iodide, an alkyl aluminum sesquiiodide compound and iodine and (4) any one of many known promoters selected from the group consisting of water, oxygen, oxygen-containing gases and oxygenated organic compounds. Thus, the process of the present invention comprises reacting butadiene in the presence of a catalyst formed by the combination comprising a tetravalent titanium compound, an organoaluminum composition having the formula $$Z_{(2.5-3.5)}Al_2Cl_{(3.5-2.5)}$$

wherein Z is selected from the group consisting of alkyl radicals containing from 2 to 4 carbon atoms and the phenyl radical, an iodide compound selected from the group consisting of an alkyl aluminum diiodide, a dialkyl aluminum iodide, iodine and an organometallic iodide composition having the formula $$Z_{(2.5-3.5)}Al_2I_{(3.5-2.5)}$$

wherein alkyl and Z are selected from the group consisting of alkyl radicals containing from 2 to 4 carbon atoms and the phenyl radical, a promoter selected from the group consisting of water, oxygen and oxygen-containing organic compounds wherein the oxygen-containing organic compound is selected from the group consisting of compounds of organic acids, RCHO,

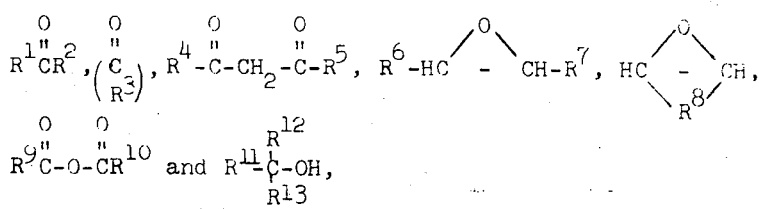

wherein R is hydrogen or an alkyl radical of from 1 to 15 carbon atoms, $R^1$ is phenyl radical or an alkyl radical of from 1 to 10 carbon atoms, $R^2$ is a phenyl radical or an alkyl radical of from 1 to 10 carbon atoms, $R^3$ is an alkylene radical of from 4 to 15 carbon atoms, $R^4$, $R^5$, $R^6$, $R^7$, $R^9$ and $R^{10}$ are alkyl radicals of from 1 to 10 carbon atoms, $R^8$ is an alkylene radical of from 6 to 10 carbon atoms, $R^{11}$, $R^{12}$ and $R^{13}$ are alkyl groups of 1 to 10 carbon atoms, and aryl and substituted aryl groups having 6 to 12 carbon atoms.

The present invention is an improved process for the preparation of 1,5,9-cyclododecatriene by contacting butadiene with a catalyst formed by mixing a tetravalent titanium compound, an organoaluminum composition of the structure $Z_{(2.5-3.5)}Al_2Cl_{(3.5-2.5)}$ wherein Z is selected from the group consisting of alkyl radicals containing from 2 to 4 carbon atoms, and the phenyl radical and a promoter selected from the group consisting of water, oxygen and oxygen-containing organic compounds; at a molar ratio of the aluminum composition to the titanium compound of from 3:1 to 30:1; with the amount of promoter set forth hereinafter, at a temperature in the range of 20° to 120°C. and at a pressure of 0.5 to 50 atmospheres; wherein the improvement resides in the inclusion in the catalyst of an iodide-containing composition or compound selected from the group consisting of $Z_{(2.5-3.5)}Al_2I_{(3.5-2.5)}$, $Z_2AlI$, $ZAlI_2$, and $I_2$ wherein Z is selected from the group consisting of alkyl radicals containing from 2 to 4 carbon atoms and the phenyl radical, the molar ratio of iodine or iodide-containing composition or compound to aluminum composition being in the range of 0.05:10 to 5:10, preferably 0.1:10 to 1:10.

The promoters of the present invention include any promoter known in the process of the trimerization of butadiene to form CDDT in the presence of a catalyst formed by the combination of a tetravalent titanium compound and an organoaluminum compound. Preferably the promoters of the present invention are selected from the group consisting of water, oxygen, oxygen-containing gases and oxygen-containing organic compounds.

The oxygen-containing organic compounds of the present invention are selected from the group consisting of compounds of organic acids,

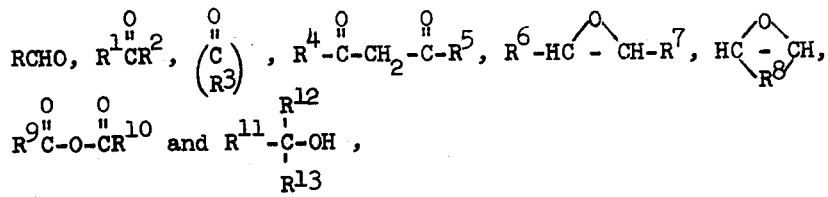

wherein R is hydrogen or an alkyl radical of from 1 to 15 carbon atoms, $R^1$ is phenyl radical or an alkyl radical of from 1 to 10 carbon atoms, $R^2$ is a phenyl radical or a hydrocarbon radical of from 1 to 10 carbon atoms, $R^3$ is an alkylene radical of from 4 to 15 carbon atoms, $R^4$, $R^5$, $R^6$, $R^7$, $R^9$ and $R^{10}$ are alkyl radicals of from 1 to 10 carbon atoms, $R^8$ is an alkylene radical of from 6 to 10 carbon atoms, $R^{11}$, $R^{12}$ and $R^{13}$ are alkyl groups of from 1 to 10 carbon atoms, and aryl and substituted aryl groups having 6 to 12 carbon atoms.

The aldehydes suitable for use as a promoter have the structure RCHO where R is hydrogen or a hydrocarbon radical containing from 1 to 15 carbon atoms. Representative examples of aldehydes include acetaldehyde, propionaldehyde, butyraldehyde, dodecylaldehyde, etc. The preferred aldehyde is acetaldehyde. The ketones suitable for use as promoters have the structure

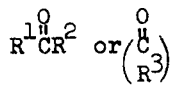

where $R^1$ is a phenyl or an alkyl radical of from 1 to 10 carbon atoms, and where $R^3$ is an alkylene radical of from 4 to 15 carbon atoms. Representative examples of ketones include acetone, hexafluoroacetone, benzophenone, cyclododecanone, etc. The preferred ketone is acetone. Diketones suitable for use as promoters have the structure

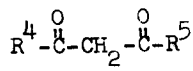

where $R^4$ is an alkyl radical of from 1 to 10 carbon atoms and $R^5$ is an alkyl radical of from 1 to 10 carbon atoms. Representative examples of diketones include 2,4-pentanedione, 6-methyl-2,4-heptanedione, etc. The preferred diketone is 2,4-pentanedione.

The epoxides suitable for use have the structure

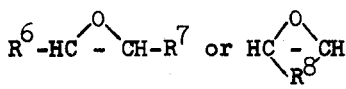

wherein $R^6$ is a hydrocarbon radical of from 1 to 10 carbon atoms and $R^7$ is a hydrocarbon radical of from 1 to 10 carbon atoms, and wherein $R^8$ is an alkylene radical containing from 6 to 20 carbon atoms. Representative examples of the epoxides include 1,2-epoxy-5,6-trans-9,10-cis-cyclododecadiene, cyclododecene oxide, etc. The preferred epoxide is 1,2-epoxy-5,6-trans-9,10-cis-cyclododecadiene.

The anhydrides suitable for use in the present invention have the structure

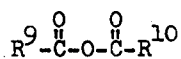

wherein $R^9$ is an alkyl radical of from 1 to 10 carbon atoms, and $R^{10}$ is an alkyl radical of from 1 to 10 carbon atoms. Representative examples of the anhydrides include acetic anhydride, propionic anhydride, butyric anhydride, etc. The preferred anhydride is acetic anhydride.

The alcohols suitable for use as promoters have the structure

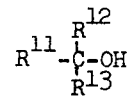

where $R^{11}$, $R^{12}$ and $R^{13}$ are alkyl groups of 1 to 10 carbon atoms and aryl and substituted aryl groups having 6 to 12 carbon atoms. Representative examples of the alcohols include 2-methyl-2-propanol, 2-methyl-2-dodecanol, 2-decyl-2-dodecanol, 11-decyl-11-heneicosanol, 2-ethyl-2-butanol, 2-methyl-2-hexanol, triphenyl methyl alcohol, 1,1-diphenyl-1-pentanol, 1-(p-hexylphenyl)-1-methyl-1-butanol, 11-phenyl-11-heneicosanol, 1-phenyl-1-butyl-1-butanol, etc. The preferred alcohols are tertiary butyl alcohol and triphenyl methyl alcohol.

Organic acids which are operable in the present invention are selected from the class consisting of formic acid, oxalic acid, and aliphatic acids having 2–15 carbon atoms, aliphatic acids having 2–15 carbon atoms which are substituted with groups selected from the class consisting of alkyls having 1–6 carbon atoms, phenyl, and alkyl substituted phenyl having 7–12 carbon atoms and wherein at least one alpha carbon atom in the main chain of said aliphatic and substituted aliphatic acids has at least one and preferably at least two hydrogen atoms attached thereto. Other substituents on the acid that do not adversely affect the catalyst or the yield to the desired products are within the purview of this invention, e.g., acids having halogen substituents sufficiently removed from the carboxyl groups are operable. Illustrations of the acids contemplated by the above definition are saturated and unsaturated, mono-, di-, and tricarboxylic acids such as formic; propionic; butyric; lauric; pentadecanoic; acrylic; crotonic; sorbic; nonanoic; 3-hexyl-; decanoic, 4-butyl-; crotonic, 3-methyl-; 2,5-heptadienedioic, 4-pentyl-; 1,2,4-hexanetricarboxylic; 3-hexynedioic; 4,6-decadiynedioic; pentyn-4-oic acid; capric; pelargonic; isobutyric; isovaleric; oxalic; malonic; pimelic; sebacic; azelaic; isocaproic; isoenanthic; succinic, glutaric; adipic; 1,12-dodecanedioic; and α, b-dimethyl-butyric acid. Formic and acetic acids are preferred.

The most preferred promoter is water. The amount of water when used as a promoter according to the invention is in the range of 0.3 to 0.9 mole per mole of aluminum composition. The amount of oxygen as oxygen gas or in an oxygen-containing gas such as air is in the range of 0.1 to 0.7 mole per mole of aluminum composition. The amount of oxygen-containing organic compound used is in the range of 0.05 to 1.0 mole per mole of the aluminum composition.

By-products from the trimerization reaction can be recycled back to the reaction system. If the recycled by-products contain oxygen, oxygenated organics or water, it is necessary to adjust the amount of promotor that is added with the catalyst to limit the total alkyl aluminum sesquichloride/promoter ratio to the prescribed ratio. Additionally, it is advantageous to remove peroxides present in the recycled by-products by eluting these by-products through activated alumina before their addition to the reactor. If the by-products are stored under nitrogen, it is not necessary to treat them with activated alumina. It is advisable, however, to determine the amount of water in these by-products as well as the presence of peroxide to assure trimerization equal to or below the alkyl aluminum sesquichloride/promoter ratio prescribed. The presence of oxygenated organic compounds can be determined from the infrared spectrum of the by-products. If oxygenated organics are present, it is again necessary to adjust the amount of promoter added together with the catalyst.

Although the by-products recycled to the trimerization reactor are predominantly 1,5-cyclooctadiene (COD) and 4-vinylcyclohexene (VCH), it is possible that other by-products are present also. Since the CDDT is separated from combined VCH/COD by distillation, other by-products with volatilities similar to VCH/COD may also be present.

Inert solvents such as cyclohexane, benzene, toluene, and the cyclododecatriene itself can be used as catalyst solvents or as diluents of the trimerization reaction itself without ill effect. The preferred solvent is benzene.

In the catalytic trimerization of butadiene, the ratio of alkyl aluminum sesquichloride to titanium compound may be varied from 3:1 to 30:1 with ratios of from 5:1 to 15:1 being preferred. Higher ratios may be used but are not desirable because of the expense of the aluminum sesquichloride.

The ratio of iodine or iodine-containing composition or compound to the aluminum sesquichloride may be varied from 0.05:10 to 5:10 with ratios of 0.1:10 to 1:10 being preferred.

Generally speaking, any tetravalent titanium compound is operable in the present process as long as it is soluble in the reaction medium to an extent of at least 0.001 percent, preferably 0.01 percent as based on CDDT at 20°C. and which does not contain a substituent that inactivates the aluminum sesquichloride catalyst. These compounds generally have the formula $TiA_4$ wherein A is selected from the class containing Cl, Br, I and OR, wherein R is a hydrocarbon radical of from 1 to 20 carbon atoms. The four A's used in a given titanium compound may be the same or different.

The catalyst may be prepared by reacting the promoter with the mixture of the iodine or iodide organoaluminum compound and the alkyl aluminum sesquichloride mixture followed by reaction of the product so formed with the titanium compound. However, for continuous operation, it is convenient to add all four catalyst components separately and simultaneously to the reaction vessel or a mixture of the iodine or iodide-containing organoaluminum compound and ethyl aluminum sesquichloride together with the other two catalyst components being added separately. If desired, all of the catalyst may be added as gases in separate butadiene streams as by vaporizing either the titanium compounds or the aluminum compound and adding the vapor to separate butadiene streams.

The present process is also applicable to the trimerization of substituted butadienes such as isoprene.

The butadiene trimerization reaction temperature generally is maintained at from 20°C. to 120°C. and preferably at from about 60°C. to about 90°C. At lower temperatures, the reaction rates become unduly slow and at higher temperatures increasing yield losses to by-products occur.

Pressure in the instant invention can be varied from one-half atm. to 50 atm., preferably at from 1 to 5 atm. The process of the present invention is carried out advantageously on a continuous basis wherein butadiene and catalyst are continuously fed to a reactor and crude product is continuously removed. The reaction can be made to occur in multiple stages to take advantage of residual catalyst activity.

CDDT is a valuable chemical intermediate which can be readily oxidized to succinic acid which is useful in the production of plastics such as polyamides. CDDT may be hydrogenated to produce cyclododecene or cyclododecane. These hydrogenated products may, in turn, be oxidized to form the corresponding dicarboxylic acids.

EXAMPLES 1-12

Examples 1 to 12 were run in a 500 cc reactor at 1 psig. The liquid volume of the reactor was 500 cc up to a side arm which was used to discharge the crude 1,5,9-cyclododecatriene (CDDT) made during continuous steady state operation. The reactor was equipped with a paddle stirrer and an external jacket through which water was circulated to control the temperature of the reaction medium. Temperature was monitored by a temperature measuring device which activated a solenoid valve controlling the water flow through the jacket. All runs in the table were made at 75°C. Unreacted butadiene from the reactor was passed through a condenser, then through a mercury seal which was used to regulate the pressure and then to a wet test meter to measure the unreacted butadiene flow. The unreacted butadiene flow was kept to a minimum. In each of the examples the reactor was charged with fresh CDDT and catalyst or the crude product from a previous run and the temperature was raised to 75°C. while simultaneously injecting butadiene and catalyst components. The catalyst ratios were adjusted (iodide-containing solutions are added separately) according to the ratios and feed rates in the table. Water was added by feeding a controlled portion of the total butadiene stream through a water saturator. Example 1 was a control run without the iodide compounds of this invention. The crude CDDT obtained during steady state operation overflowed through the side arm and the catalyst in the crude reaction product was deactivated by saturation with anhydrous ammonia.

The average rate of reaction throughout a run is expressed as the number of pounds of crude CDDT produced per gallon of reactor space per hour of the analysis shown that was actually obtained. The catalyst efficiency is expressed in the pounds of crude CDDT produced per pound of titanium tetrachloride. In all cases the chemical yield with iodine containing additives present was up to 3% better than that obtained with it not present. Productivities and catalyst efficiencies are generally increased up to 21% in the presence of iodide-containing additives. The results of Examples 1-12 are summarized in the table. All results in the table were based on steady state conditions.

TABLE[1]

| EX. | ADDITIVE = A | MOLAR RATIO A/EAS/TT/W | PRODUCTIVITY LBS CRUDE CDDT/GAL/HR | SINGLE STAGE CATALYST EFF. LBS CRUDE/LB TT | % YIELD CDDT/VCH/COD/NVR/TOTAL |
| --- | --- | --- | --- | --- | --- |
| 1 | None[2] | 0/10/1/5 | 8.77 | 3930 | 87.2/1.51/3.24/7.49/99.4 |
| 2 | Diethyl Aluminum Iodide | 0.2/9.8/1/5 | 9.25 | 4150 | 89.0/1.51/3.42/5.85/99.8 |
| 3 | " | 0.4/9.8/1/5 | 9.18 | 4120 | 89.4/1.43/3.70/5.57/100.1 |
| 4 | " | 0.6/9.7/1/5 | 9.03 | 4060 | 89.5/1.41/3.65/5.34/99.9 |
| 5 | Ethyl Aluminum Diiodide | 0.2/9.8/1/5 | 9.76 | 4380 | 89.4/1.41/3.37/5.46/99.6 |
| 6 | " | 0.4/9.8/1/5 | 9.80 | 4400 | 89.9/1.36/3.55/5.24/100.1 |
| 7 | " | 0.6/9.7/1/5 | 10.6 | 4760 | 90.4/1.40/3.41/4.67/99.9 |
| 8 | Ethyl Aluminum Sesquiiodide | 0.1/9.9/1/5 | 10.5 | 4720 | 89.2/1.47/3.59/5.49/99.8 |
| 9 | " | 0.2/9.8/1/5 | 9.75 | 4380 | 88.9/1.32/3.16/5.56/98.9 |
| 10 | " | 0.3/9.7/1/5 | 9.48 | 4260 | 90.3/1.26/3.13/4.65/99.3 |
| 11 | Iodine | 0.5/10/1/5 | 10.0 | 4490 | 89.5/1.26/3.10/5.44/99.3 |
| 12 | " | 1.0/10/1/5 | 10.3 | 4630 | 88.9/0.99/2.40/6.00/98.3 |

[1] Continuous 500 cc reactor — Conditions: $TiCl_4$ (TT) Feed rate = 1.0g/gal/hr Temp. = 75°C., Press. = 1 psig. EAS = Ethyl Aluminum Sesquichloride, W = water promoter.
[2] Average five runs.

The process of the present invention results surprisingly and unexpectedly in improved yields and productivities. As evidence of this the following examples are included.

EXAMPLE 13

The procedure described in Examples 1–12 was followed except that ethyl iodide was added as the additive so that the mol ratio of ethyl aluminum sesquichloride/titanium tetrachloride/water/ethyl iodide was 10/1/5/1. The results were about the same as for the control run: the efficiency was 3860 lbs/lb $TiCl_4$; the percent yield of CDDT was 87.3%; the productivity was 8.6 lbs crude CDDT/gal/hr.

EXAMPLE 14

The procedure of Examples 1–12 was followed except that the catalyst used did not contain ethyl aluminum sesquichloride. The catalyst was ethyl aluminum sesquiiodide/titanium tetrachloride/water in mol ratio of 10/1/5. There was a marked deterioration in the reaction indicating the reaction to be inferior in contrast to the control runs.

While certain representative embodiments and details have been shown for the purpose of illustrating the invention, it will be apparent to those skilled in this art that various changes and modifications may be made therein without departing from the spirit or scope of the invention.

We claim:

1. In the process for the preparation of 1,5,9-cyclododecatriene which comprises contacting butadiene in a reactor with a catalyst system resulting from the mixing of an aluminum composition of the structure $$Z_{(2.5-3.5)}Al_2Cl_{(3.5-2.5)}$$

wherein Z is selected from the group consisting of alkyl radicals containing from 2 to 4 carbon atoms and the phenyl radical; a titanium compound of the formula $TiA_4$ wherein A is selected from the class consisting of Cl, Br, I and OR wherein R is an organic radical of from 1 to 20 carbon atoms, in an amount such that the molar ratio of the aluminum composition to the titanium compound is maintained at from 3:1 to 30:1; and a promoter for the catalyst system wherein the promoter is selected from the group consisting of water in an amount of 0.3 to 0.9 mole per mole of aluminum composition, oxygen in an amount of 0.1 to 0.7 mole per mole of aluminum composition and oxygen-containing organic compounds in an amount of 0.05 to 1.0 mole per mole of aluminum compound, wherein the oxygen-containing compound is selected from the group consisting of compounds of organic acids,

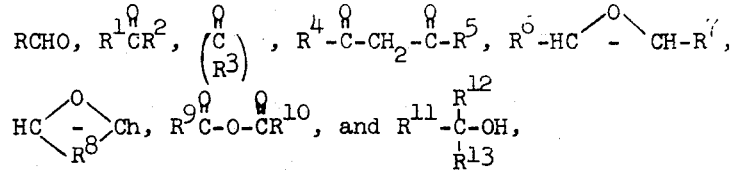

wherein R is hydrogen or an alkyl radical of from 1 to 15 carbon atoms, $R^1$ is phenyl radical or an alkyl radical of from 1 to 10 carbon atoms, $R^2$ is a phenyl radical or an alkyl radical of from 1 to 10 carbon atoms, $R^3$ is an alkylene radical of from 4 to 15 carbon atoms, $R^4$, $R^5$, $R^6$, $R^7$, $R^9$ and $R^{10}$ are alkyl radicals of from 1 to 10 carbon atoms, $R^8$ is an alkylene radical of from 6 to 10 carbon atoms, $R^{11}$, $R^{12}$ and $R^{13}$ are alkyl groups of 1 to 10 carbon atoms and aryl and substituted aryl groups having 6 to 12 carbon atoms; at a temperature in the range of 20° to 120°C. and at a pressure of 0.5 to 50 atmospheres and recovering cyclododecatriene-1,5,9 along with by-products 1,5-cyclooctadiene and 4-vinylcyclohexene; the improvement which comprises adding an iodide-containing composition or compound selected from the group consisting of $Z_{(2.5-3.5)}Al_2I_{(3.5-2.5)}$, $Z_2AlI$, $ZAlI_2$ and $I_2$ wherein Z is selected from the group consisting of alkyl radicals containing from 2 to 4 carbon atoms and the phenyl radical, the molar ratio of iodine or iodide-containing composition or compound to aluminum composition being in the range of 0.05:10 to 5:10.

2. The process of claim 1 wherein the molar ratio of iodine or iodide-containing composition or compound to aluminum composition is in the range of 0.1:10 to 1:10.

3. The process of claim 1 wherein the molar ratio of the aluminum composition to the titanium compound is from 5:1 to 15:1.

4. The process of claim 1 wherein the aluminum compound is ethyl aluminum sesquichloride.

5. The process of claim 1 wherein the titanium compound is titanium tetrachloride.

6. The process of claim 1 wherein the promoter is water.

7. The process of claim 1 wherein the promoter is formic acid.

8. The process of claim 1 wherein the promoter is acetic acid.

* * * * *